US007575714B2

United States Patent
Obata et al.

(10) Patent No.: US 7,575,714 B2
(45) Date of Patent: Aug. 18, 2009

(54) SILVER ALLOY EXCELLENT IN REFLECTANCE MAINTENANCE PROPERTY AND METHOD FOR PRODUCING AN OPTICAL RECORDING MEDIUM

(75) Inventors: Tomokazu Obata, Isehara (JP); Hiroshi Yanagihara, Isehara (JP)

(73) Assignee: Tanaka Kikinzoku Kogyo K.K., Tokyo (JP)

( * ) Notice: Subject to any disclaimer, the term of this patent is extended or adjusted under 35 U.S.C. 154(b) by 213 days.

(21) Appl. No.: 10/577,870

(22) PCT Filed: Dec. 9, 2004

(86) PCT No.: PCT/JP2004/018367

§ 371 (c)(1),
(2), (4) Date: Apr. 28, 2006

(87) PCT Pub. No.: WO2005/056850

PCT Pub. Date: Jun. 23, 2005

(65) Prior Publication Data

US 2007/0026187 A1    Feb. 1, 2007

(30) Foreign Application Priority Data

Dec. 10, 2003    (JP)    ............................. 2003-411719

(51) Int. Cl.
*C22C 5/06* (2006.01)
*C22C 5/00* (2006.01)
*B32B 3/02* (2006.01)

(52) U.S. Cl. ....................... 420/501; 148/430; 428/64.2

(58) Field of Classification Search ................ 420/64.2, 420/501; 428/64.2; 148/430
See application file for complete search history.

(56) References Cited

U.S. PATENT DOCUMENTS

| 2002/0114915 | A1* | 8/2002 | Ohno et al. | ................. 428/64.4 |
| 2002/0150772 | A1 | 10/2002 | Nakai et al. | ................. 428/457 |
| 2003/0143342 | A1 | 7/2003 | Fujii et al. | .................... 428/1.1 |
| 2003/0180177 | A1 | 9/2003 | Murata | ....................... 420/503 |

FOREIGN PATENT DOCUMENTS

| JP | 11-134715 | 5/1999 |
| JP | 2000-109943 | 4/2000 |
| JP | 2002-226927 | 8/2002 |
| JP | 2002319185 | 10/2002 |
| JP | 2002-323611 | 11/2002 |
| JP | 3365762 | 11/2002 |
| JP | 2003113433 A * | 4/2003 |
| JP | 2003-155561 | 5/2003 |
| JP | 2003-279715 | 10/2003 |
| JP | 2004-131747 | 4/2004 |

* cited by examiner

*Primary Examiner*—Roy King
*Assistant Examiner*—Caitlin Fogarty
(74) *Attorney, Agent, or Firm*—Roberts & Roberts, LLP

(57) ABSTRACT

The present invention is a silver alloy including silver as the main component and at least one rare-earth element as a first dopant element, and excellent in reflectance maintenance property. In the present invention, the first dopant element is preferably samarium, neodymium, lanthanum, cerium, ytterbium, terbium, dysprosium, holmium, erbium, thulium, europium, and gadolinium. Also, in the present invention, the silver alloy preferably includes, as a second dopant element, at least one element selected from copper, manganese, silicon, chromium, nickel, cobalt, yttrium, iron, scandium, zirconium, niobium, molybdenum, tantalum, tungsten, platinum, gold, rhodium, iridium, palladium, indium, tin, lead, aluminum, calcium, gallium, bismuth, antimony, strontium, hafnium, and germanium.

6 Claims, 3 Drawing Sheets

SILVER ALLOY EXCELLENT IN REFLECTANCE MAINTENANCE PROPERTY AND METHOD FOR PRODUCING AN OPTICAL RECORDING MEDIUM

TECHNICAL FIELD

The present invention relates to a silver alloy suitable as a material for forming reflective films provided on optical recording media, displays and the likes. Particularly, the present invention relates to a silver alloy for reflective films capable of maintaining the reflectance thereof even in long-term use.

BACKGROUND ART

Silver is recognized as a most preferable material as a material for reflective films to be used in optical recording media, displays and the like. This is because silver is high in reflectance, and additionally, lower in price than gold that is also high in reflectance. In the field of optical recording media in these years, transition to recordable/rewritable media (CD-R/RW, DVD-R/RW/RAM) takes place, and expanding importance of optical recording media attaches importance to silver that is high in reflectance and relatively low in cost as a central material for use in reflective films.

On the other hand, silver involves a problem such that silver is poor in corrosion resistance and is degraded in reflectance by discoloration to black through corrosion. The root causes for the corrosion of reflective films may vary with products (recording media, displays and the like) to which the reflective films are applied, in such a way that, for example, reflective films of displays suffer from a fear that they are corroded due to the atmospheric humidity or the like.

A reflective layer of an optical recording medium also suffers from a fear of corrosion due to the atmosphere such as the air, and furthermore, requires a consideration of corrosion caused by the effects of the other constituent layers (the recording layer, dielectric layer and the like) in contact with the reflective layer in the recording medium. For example, a recordable optical disk (CD-R, DVD-R, DVD+R or the like) has a structure in which an organic azo or cyanine dye ink is coated on a polycarbonate substrate and dried to form a recording layer, a reflective layer is formed on the surface of the recording layer, and the recording layer with the reflective layer is bonded to another polycarbonate substrate with an ultraviolet cure adhesive. In this case, the organic dye ink in the recording layer and the ultraviolet cure adhesive, both in contact with the reflective layer, contain sulfur as a component thereof or as an impurity, and accordingly, the reflective layer is exposed to a fear of corrosion in the course of use thereof because silver is poor in resistance to sulfidation. On the other hand, a rewritable optical disk (CD-RW, DVD-RW, DVD+RW, DVD-RAM or the like) has a structure in which a derivative layer, a recording layer, a dielectric layer and a reflective layer are laminated in such a condition that the reflective layer is in contact with the dielectric layer. Various materials are available for the dielectric layer, but in these years, materials to which zinc sulfide (ZnS) is applied are being used (sometimes, for the purpose of controlling heat reserve, a material made of zinc sulfide doped with silicon oxide, namely, ZnS-20 mol % $SiO_2$ or the like being applied). Consequently, also in this case, there is a fear of corrosion due to a sulfide. As described above, the reflective layer of an optical recording medium is in such an environment that the reflective layer is in contact with a layer containing sulfur or a sulfide, irrespective as to whether the optical recording medium is recordable or rewritable in type; thus, the resistance to sulfidation comes to be more significant than the corrosion caused by the atmosphere involving humidity or the like, and there is a fear that the reflectance of the reflective layer is degraded by the long-term use of the recording medium.

Additionally, there is a problem that a reflective film made of silver is also thermally degraded in reflectance. The mechanism involved in the reflectance degradation due to heating is not yet elucidated, but it has been verified that heating of a thin silver film causes a phenomenon in which local agglomeration occurs in the thin film so as to expose the underlayer. Accordingly, the reflective film of an optical recording medium, a plasma display or the like is required to have a heat resistance because it possibly undergoes heating.

For the purpose of coping with the reflectance degradation of the reflective film as described above, there have conventionally been developed silver alloys, for use in reflective films, that are improved in corrosion resistance and heat resistance while the reflectance being secured. These alloys mostly include silver as the main component, and are doped with one or more of various elements as dopant elements; examples of such disclosed alloys include, for example, an alloy in which silver is doped with 0.5 to 10 atomic % of ruthenium and 0.1 to 10 atomic % of aluminum, and another alloy in which silver is doped with 0.5 to 4.9 atomic % of palladium. It has been disclosed that these silver alloys are satisfactory in corrosion resistance, can maintain the reflectance in service environment, and consequently, suitable for reflective films (for the details of the conventional art, see Patent Documents 1 and 2).

Patent Document 1: Japanese Patent Laid-Open No. Hei 11-134715

Patent Document 2: Japanese Patent Laid-Open No. 2000-109943

As for the above described silver alloys, improvements of the corrosion resistance and heat resistance have been developed to some extents. However, even these silver alloys are not absolutely free from deterioration in service environment. Additionally, the reflectance is not completely guaranteed against reflectance degradation, and materials that can maintain the reflectance at a higher level are desired.

In the field of optical recording devices, at present, red semiconductor lasers (wavelength: 650 nm) are applied as recording light sources, but blue lasers (wavelength: 405 nm) have almost seen their way clear to practical use. Application of the blue laser can ensure a memory capacity 5 to 6 times as large as the memory capacity of an optical recording device available at present, so that optical recording devices incorporating blue lasers applied thereto will conceivably form the mainstream of the next-generation optical recording devices. In this connection, according to the present inventors, it has been verified that the reflectance of a reflective film varies with the wavelength of the incident laser light; in particular, it has been verified that shorter-wavelength laser irradiation degrades the reflectance irrespective as to whether corrosion occurs or not, and makes the extent of the reflectance degradation due to corrosion frequently larger than the longer-wavelength laser irradiation. Consequently, for the purpose of producing recording media adaptable to the development of the future recording light sources, it is desired to develop a material that has a high reflectance even for the laser irradiation in a shorter wavelength region, and furthermore, can maintain the reflectance within a range of practical use.

The present invention has been achieved on the above described background, and is aimed at providing a material that is a silver alloy to form a reflective film of an optical recording medium or the like, and is workable without degrading the reflectance even in a long-term use. Additionally, the present invention provides a material that has a high reflectance even for a short wavelength laser light.

DISCLOSURE OF THE INVENTION

Figure 1:
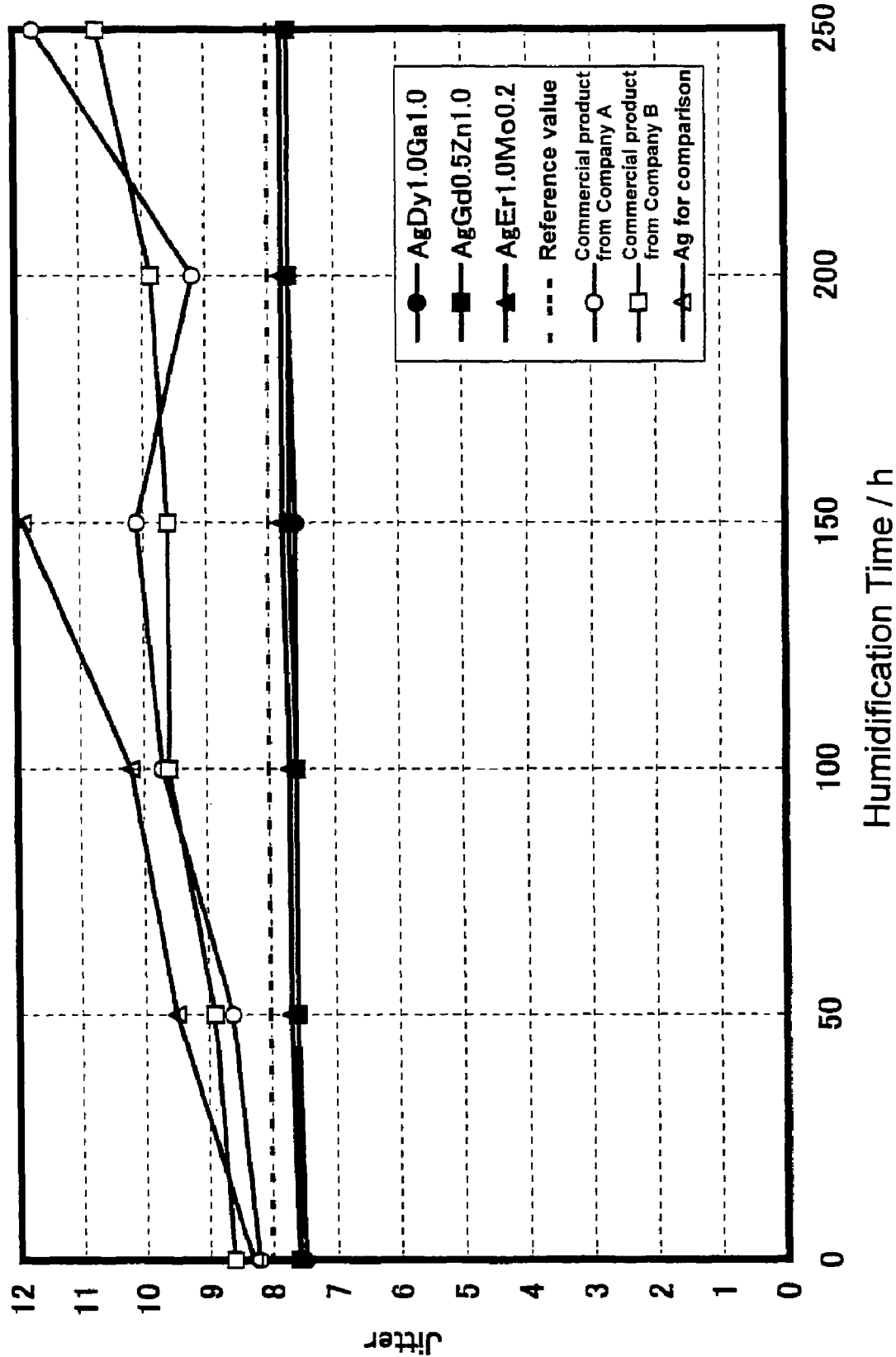
FIG. 1 is a graph showing the results (jitter values) of an accelerated environment test carried out on DVD-R media each provided with one of the reflective films according to present Embodiment.

In order to solve the above described problems, the present inventors selected appropriate dopant elements with silver as the main component similarly to the conventional art. Consequently, the present inventors have come up with the present invention by discovering that the addition of a rare-earth element, as a dopant element is effective in maintaining the reflectance and is useful for improving the heat resistance, the moisture resistance or the resistance to sulfidation.

The present invention is a silver alloy for use in a reflective film, including silver as a main element and at least one rare-earth element as a first dopant element.

Here, the rare-earth element as the first dopant element is selected depending on which of the properties of the thin film is considered as important. According to the present inventors, the rare-earth elements useful for improving the performances of the silver alloy thin film are dysprosium, thulium, terbium, gadolinium, erbium, neodymium, holmium, praseodymium, samarium, lanthanum, cerium, ytterbium, and europium. Inclusion of at least one of these metal elements can lead to a silver thin film useful for maintaining the high reflectance.

According to the investigations carried out by the present inventors, it has been verified that a silver alloy, doped with dysprosium or thulium among the above described elements, can maintain the various properties required for a reflective film at specially high levels. Such a silver-dysprosium alloy and such a silver-thulium alloy are excellent both in corrosion resistance and in heat resistance, and are suitable not only for the reflective layer for use in an optical recording medium but also for the reflective film for use in a display.

Further, in the present invention, the silver alloy is preferably an alloy doped with at least one element, as a second dopant element, selected from gallium, platinum, palladium, magnesium, zinc, nickel, molybdenum, gold, aluminum, copper, cobalt, tin, titanium, bismuth, manganese, scandium, yttrium, silicon, chromium, iron, zirconium, niobium, tantalum, tungsten, rhodium, iridium, indium, lead, aluminum, calcium, antimony, strontium, hafnium, germanium, boron and strontium. These elements have effects to improve, in cooperation with the first dopant element, the resistance to sulfidation, moisture resistance and heat resistance, and work in combination with the first dopant elements.

In particular, a silver alloy doped with a second dopant element of gallium, platinum or palladium is a preferable alloy because such an alloy can effectively suppress the agglomeration phenomenon which possibly occur in a thin film material in a humidified environment.

Additionally, the dopant element concentration, namely, total of the concentration(s) of the first dopant element(s) and the concentration(s) of the second dopant element(s) is preferably 0.01 to 5.0 atomic %. When the addition amount is less than 0.01 atomic %, no effect of the reflectance maintenance is found. When the dopant element concentration exceeds 5.0 atomic %, the reflectance degradation becomes large depending on the service environment and the incident laser light wavelength, and it becomes impossible to ensure the reflectance. The concentration is particularly preferably 0.01 to 3.0 atomic %, because this range of concentration can maintain the reflectance at a higher level irrespective of the service environment and the laser light wavelength.

The above-described silver alloy, according to the present invention, as the material for use in a reflective film, can be produced by the melt casting method and the sintering method. The production based on the melt casting method involves no particular difficulties, and can produce the alloy by means of a general method in which individual raw materials are weighed out, mixed by melting, and the mixture is subjected to casting. The sintering method also involves no particular difficulties, and can produce the alloy by means of a general method in which individual raw materials are weighed out, and subjected to sintering.

The silver alloy according to the present invention has properties favorable for a reflective film, and suppresses the reflectance degradation in the course of use. As described below, the silver alloy according to the present invention exhibits a more satisfactory reflectance and a more satisfactory maintenance of the reflectance than conventional materials for use in reflective films, even under irradiation with a short wavelength laser light. As described above, the sputtering method is generally applied to the production of reflective films of optical recording media and the like. Accordingly, sputtering targets made of the silver alloy according to the present invention can serve to produce optical recording media, displays and the like each provided with a reflective film having satisfactory properties.

As described above, according to the present invention, a reflective film that is less degraded in reflectance even under long-term use can be produced, and various devices to which reflective films are applied, such as optical recording media, displays and the like, can be made to have a long operation life. The silver alloy according to the present invention also exhibits a more satisfactory reflectance and a more satisfactory maintenance of the reflectance than conventional materials for use in reflective films, even under irradiation with a short wavelength laser light. Accordingly, the silver alloy according to the present invention is compatible with recording media for use in optical recording devices each having a short wavelength laser as the light source, such recording devices being anticipated to form the mainstream of such devices.

BEST MODE FOR CARRYING OUT THE INVENTION

Hereinafter, a preferred embodiment of the present invention is described together with comparative examples. Here, binary and ternary silver alloys having various compositions with Ag as the main component were produced; targets were produced from these alloys, and thin films were formed therefrom by means of a sputtering method. These thin films were subjected to corrosion tests (accelerated tests) in various environments, and the reflectance variations as observed after the corrosion tests were examined.

In the production of each of the silver alloys, individual metals were weighed out so as to give predetermined concentrations, mixed by melting in a high frequency melting furnace to yield an alloy. The molten alloy thus obtained was cast into a casting mold to be solidified to yield an ingot, the ingot was forged, rolled and heat treated, and thereafter shaped into a sputtering target.

In the thin film production, a substrate (borosilicate glass) and a target were placed in a sputtering apparatus, the interior of the apparatus was evacuated to a vacuum of $5.0 \times 10^{-3}$ Pa, and then argon gas was introduced into the interior of the apparatus so as to give a pressure of $5.0 \times 10^{-1}$ Pa. Sputtering conditions were such that film formation was carried out with a direct current power of 4 kW for 8 seconds to attain a film thickness of 1200 Å. It is to be noted that the film thickness distribution fell within ±10%.

The thin film products were evaluated with respect to heat resistance and moisture resistance. These properties were evaluated as follows: a thin film was exposed to each corresponding environment and the reflectance of the thin film after each test was measured at a varying wavelength in a spectrophotometer; and the observed reflectances at different wavelengths were compared differentially with the corresponding reflectances of silver as the reference levels, which were measured immediately after film formation.

The heating test to examine the heat resistance of a thin film was carried out as follows: the thin film was placed on a hot plate, heated in an atmosphere at 250° C. for 1 hour, and the reflectance after heating was evaluated. The humidification test to examine the moisture resistance of a thin film was carried out as follows: the thin film was exposed to an atmosphere of a temperature of 100° C. and a humidity of 100%, and the reflectance after humidification was evaluated; the exposure time was varied to take two periods, namely, 24 hours (humidification test I) and 100 hours (humidification test II). The results of these corrosion tests are shown in Tables 1 to 3. The reflectances shown in these tables are relative values based on the reflectances of silver immediately after film formation which are set at 100. The measured reflectance values are the values measured at the wavelengths of 400 nm, 550 nm and 650 nm (respectively corresponding to the wavelengths of blue, yellow and red lasers). It is to be noted that each of these tables includes, for comparison, the test results obtained for a thin film produced from a target made of pure silver.

TABLE 1

Incident light wavelength: 400 nm Reflectance

| Sample composition (at %) | Immediately after deposition | Heating test | Humidification test I | Humidification test II |
|---|---|---|---|---|
| Ag—0.5Sm | 91.6 | 89.7 | 70.3 | 68.3 |
| Ag—0.8Nd | 80.6 | 44.5 | 89.6 | 78.4 |
| Ag—0.6Yb | 99.3 | 80.1 | 58.6 | 58.7 |
| Ag—0.7Eu | 83.4 | 85.0 | 76.4 | 77.0 |
| Ag—0.4Sm—0.6Ga | 102.4 | 94.1 | 71.6 | 15.0 |
| Ag—0.4Sm—0.5In | 104.3 | 91.1 | 80.7 | 35.7 |
| Ag—0.7Nd—0.7Cu | 89.0 | 87.8 | 71.9 | 70.8 |
| Ag—0.5Nd—0.5In | 92.8 | 70.8 | 83.5 | 83.0 |
| Ag—0.5Gd—0.5In | 92.4 | 69.9 | 84.6 | 81.6 |
| Ag—0.5Tb—0.5In | 91.3 | 66.8 | 92.5 | 62.5 |
| Ag—0.5Ho—0.5Cu | 94.5 | 84.1 | 80.3 | 58.5 |
| Ag—0.5Er—0.5Cu | 94.5 | 87.1 | 82.9 | 63.3 |
| Ag—0.5Tm—0.5Cu | 90.7 | 81.9 | 83.1 | 59.9 |

TABLE 1-continued

Incident light wavelength: 400 nm Reflectance

| Sample composition (at %) | Immediately after deposition | Heating test | Humidification test I | Humidification test II |
|---|---|---|---|---|
| Ag—0.5Sm—0.5Cu | 92.5 | 81.1 | 79.0 | 54.7 |
| Ag—0.5Gd—0.5Cu | 93.2 | 86.1 | 81.3 | 60.1 |
| Ag (for comparison) | 102.3 | 1.6 | 45.9 | 37.5 |

TABLE 2

Incident light wavelength: 550 nm Reflectance

| Sample composition (at %) | Immediately after deposition | Heating test | Humidification test I | Humidification test II |
|---|---|---|---|---|
| Ag—0.5Sm | 96.9 | 97.5 | 94.2 | 95.5 |
| Ag—0.8Nd | 99.7 | 63.2 | 97.5 | 93.5 |
| Ag—0.6Yb | 100.5 | 90.4 | 94.8 | 90.5 |
| Ag—0.7Eu | 99.8 | 96.5 | 94.6 | 94.5 |
| Ag—0.4Sm—0.6Ga | 100.3 | 96.1 | 88.7 | 21.1 |
| Ag—0.4Sm—0.5In | 99.7 | 92.8 | 85.5 | 40.5 |
| Ag—0.7Nd—0.7Cu | 95.7 | 95.5 | 85.2 | 84.0 |
| Ag—0.5Nd—0.5In | 96.7 | 82.6 | 89.3 | 89.7 |
| Ag—0.5Gd—0.5In | 97.3 | 81.3 | 92.3 | 91.4 |
| Ag—0.5Tb—0.5In | 96.4 | 82.2 | 92.0 | 71.2 |
| Ag—0.5Ho—0.5Cu | 98.9 | 94.6 | 90.2 | 67.2 |
| Ag—0.5Er—0.5Cu | 99.0 | 95.5 | 92.4 | 71.1 |
| Ag—0.5Tm—0.5Cu | 96.9 | 93.9 | 95.3 | 69.0 |
| Ag—0.5Sm—0.5Cu | 97.3 | 93.5 | 91.1 | 67.0 |
| Ag—0.5Gd—0.5Cu | 98.7 | 96.1 | 92.5 | 68.8 |
| Ag (for comparison) | 100.8 | 1.5 | 78.4 | 67.8 |

TABLE 3

Incident light wavelength: 650 nm Reflectance

| Sample composition (at %) | Immediately after deposition | Heating test | Humidification test I | Humidification test II |
|---|---|---|---|---|
| Ag—0.5Sm | 98.1 | 98.9 | 97.2 | 97.3 |
| Ag—0.8Nd | 99.9 | 70.5 | 98.0 | 95.1 |
| Ag—0.6Yb | 100.6 | 91.6 | 96.9 | 92.2 |
| Ag—0.7Eu | 100.2 | 97.8 | 96.0 | 95.3 |
| Ag—0.4Sm—0.6Ga | 100.9 | 98.8 | 89.5 | 22.9 |
| Ag—0.4Sm—0.5In | 99.1 | 92.9 | 86.8 | 42.0 |
| Ag—0.7Nd—0.7Cu | 96.9 | 97.3 | 87.0 | 86.3 |
| Ag—0.5Nd—0.5In | 97.7 | 84.2 | 91.8 | 92.3 |
| Ag—0.5Gd—0.5In | 97.7 | 83.2 | 94.2 | 93.4 |
| Ag—0.5Tb—0.5In | 97.3 | 86.3 | 94.1 | 73.2 |
| Ag—0.5Ho—0.5Cu | 99.2 | 96.6 | 91.2 | 67.8 |
| Ag—0.5Er—0.5Cu | 99.4 | 97.2 | 93.2 | 71.3 |
| Ag—0.5Tm—0.5Cu | 97.7 | 96.2 | 96.5 | 69.6 |
| Ag—0.5Sm—0.5Cu | 98.0 | 95.8 | 92.6 | 68.7 |
| Ag—0.5Gd—0.5Cu | 99.1 | 97.5 | 93.3 | 69.4 |
| Ag (for comparison) | 100.6 | 1.6 | 86.0 | 78.6 |

As can be seen from these results, the thin films produced from the silver alloys according to the present example gave the reflectance values higher than those of silver to verify the effects of improving the heat resistance and the moisture resistance. As a general tendency, with decreasing incident light wavelength, the reflectance was lowered.

Next, part of the produced thin films were subjected to a sulfidation test for the purpose of evaluating the resistance to sulfidation in such a way that the reflectance values after the test were evaluated. In the sulfidation test, each thin film was soaked in a 0.01% aqueous solution (temperature: 25° C.) of sodium sulfide for 1 hour. The results thus obtained are shown in Table 4; from these test results, it has been able to be verified that in all the wavelength regions, the resistance to sulfidation tends to be improved for the alloy thin films according to the present embodiment.

TABLE 4

|  | Reflectance | | | | | |
| --- | --- | --- | --- | --- | --- | --- |
|  | 400 nm | | 550 nm | | 650 nm | |
| Sample composition (at %) | Immediately after deposition | After test | Immediately after deposition | After test | Immediately after deposition | After test |
| Ag—0.5Sm | 91.6 | 37.0 | 96.9 | 45.9 | 98.1 | 58.4 |
| Ag—0.4Sm—0.5In | 104.3 | 52.4 | 99.7 | 68.0 | 99.1 | 76.7 |
| Ag—0.5Nd—0.5In | 92.8 | 44.0 | 96.7 | 68.2 | 97.7 | 75.4 |
| Ag—0.5Gd—0.5In | 92.4 | 53.0 | 97.3 | 77.5 | 97.7 | 85.2 |
| Ag—0.5Dy—0.5In | 92.7 | 50.2 | 97.9 | 72.4 | 98.4 | 81.0 |
| Ag—0.5Er—0.5In | 95.2 | 47.8 | 98.7 | 68.6 | 99.1 | 78.4 |
| Ag—0.5Tb—0.5In | 91.3 | 53.5 | 96.4 | 73.4 | 97.7 | 80.8 |
| Ag (for comparison) | 102.3 | 31.3 | 100.8 | 39.6 | 100.6 | 53.5 |

Next, the applicability as a practical reflective film was evaluated for each silver alloy film according to the present invention. Actually, this evaluation was carried out on the basis of two evaluation methods: one was a convenient simulated evaluation method that was devised by the present inventors and the other was an evaluation method in which an optical recording medium was actually produced and the performance (presence or absence of error) thereof was examined. The reason why the former simulated evaluation was carried out in the present invention is as follows: in an optical recording medium taken as an example, the optical recording medium is composed of a large number of layers including, in addition to the reflective layer, a substrate and a recording layer, and including, depending on the type of the medium, a dielectric layer, a heat release layer and the like; and for the purpose of evaluating the adaptability of the reflective layer of the optical recording medium, it is necessary that these constituent layers are formed on the substrate to produce the recording medium, and then the recording medium is evaluated, and this is troublesome.

For optical recording media in practical use, it is relatively easy to produce such media for an evaluation purpose. However, high-density large-capacity recording media under development for practical use in future, such as HD-DVD disks and Blu-lay disks, become more complex in structure and have reflective layers to work as semitransparent reflective layers that are anticipated to be used as further thinner films (the film thickness of the reflective layer of an optical recording medium currently used being around 1000 to 1200 Å, but the reflective layer of such a next generation optical recording medium being developed for a film thickness of 200 Å or less). As for such media to be complex as described above, it is difficult to actually produce and evaluate them.

Consequently, for the purpose of evaluating the adaptability of a thin film as a reflective film without producing an optical recording medium, the present inventors has adopted a method, as a convenient method, in which such a film is exposed in a predetermined environment, and thereafter the surface appearance of the film is observed to evaluate the adaptability of the thin film to practical use.

In this method, the humidification test is carried out as follows: first, a formed thin film is allowed to stand (for 20 to 30 minutes) in a cooling atmosphere set at a temperature (preferably 10° C.) lower than room temperature to be sufficiently cooled together with the substrate; the thus cooled thin film is exposed in a humidification environment; and the thin film is taken out and dried, and thereafter a surface appearance of the thin film is observed. The humidification environment is preferably an atmosphere at a temperature of 100° C. and with a humidity of 100%, and the exposure time in this case is preferably set at 20 minutes. In the heating test, a formed thin film is directly placed together with the substrate in a heating environment; the heating environment is preferably an air atmosphere at 250° C., and the exposure time in this case is preferably set at 60 minutes.

The observation of the surface appearance is conducted to evaluate the evaluation of the degree of generation of silver agglomerates (hereinafter referred to as black spots) occurring as black spots on the thin film surface after having been exposed in each environment. This is based on the consideration that: as a form of deterioration of a heated silver alloy film, silver agglomerates are locally generated on the surface of the film; silver agglomerates conceivably affect the properties of a reflective film; and accordingly, the evaluation of the generation degree of the black spots allows the adaptability as a reflective film to be determined. In this evaluation, the black spots to be counted are preferably those each having a size of 1 to 10 μm. Such clear definition of the spots to be evaluated allows the evaluation to be facilitated. Such a size as described above matches the size of marks to be used for record reproduction in an optical recording medium.

The evaluation of the generation degree of the black spots may be carried out, for example, by taking a photo of the surface of the thin film, and by subjecting the photo to image processing to derive the rate of the area of the black spots. As a more convenient method, there is one in which evaluation is carried out by taking as a reference the surface condition (in this case, almost no black spots being generated) of a silver thin film immediately after formation thereof and by assessing the surface condition of a thin film after heating, relatively to the reference, through classification into a few levels.

In the present embodiment, the humidification environment was set to be an atmosphere at a temperature of 100° C. and with a humidity of 100%, with the exposure time set at 20 minutes. In the simulated evaluation of a thin film in the present embodiment, different type of 1200 Å silver alloy thin films was produced, and each thin film was cooled and thereafter exposed in the above described humidification environment to be subsequently subjected to optical microscopic observation of the surface appearance thereof. The surface condition of a silver thin film immediately after the production thereof was taken as a reference to be graded as "level 1," and the surface condition evaluation was carried out in terms of 5 grades in the degrading order of the surface condition from level 1 (in the order of increasing number of the black spots) in such a way that the properties of the films were assessed through classification into level to level 1 to 5. The results thus obtained are shown in Table 5.

TABLE 5

Film thickness: 1200 Å

| | Samples (at %) | |
|---|---|---|
| Level | Binary alloy | Ternary alloy |
| 1 | Ag—1.0Tm Ag—1.0Dy | |
| 2 | Ag—1.0Tb Ag—1.0Gd Ag—1.0Er | Ag—1.0Ni—1.0Ga |
| 3 | Ag—1.0Nd Ag—1.0Ho | |
| 4 | Ag—1.0Pr | |
| 5 | Ag—1.0Sm Ag—1.0Yb Ag—1.0La Ag—1.0Ce Ag—1.0Eu | Ag—0.5Sm—0.8In |

Level 1 refers to the surface condition of silver immediately after deposition.

As a result of the simulated test, it is inferred that excellent, in properties, among the binary alloys are those containing thulium or dysprosium, and excellent, in properties, among the ternary alloys is that containing gallium as the second dopant element.

Next, DVD-R media having as a reflective layer thin films made of the silver alloys according to the present invention were actually produced and were evaluated for the properties as the reflective film of an optical recording medium. In this test, there were used as substrates polycarbonate substrates (120 mm in diameter, 0.6 mm in plate thickness, 0.17 µm in groove depth, 0.3 µm in groove width, and 0.74 µm in groove pitch) with preformatted pattern formed thereon, produced with an injection molding machine equipped with a stamper. On the upper side of each substrate, a metal-containing azo recording ink was coated by way of spin coating and dried, and thereafter, a reflective film was formed so as to have a film thickness of 1200 Å with a sputtering target produced in the present embodiment. To each substrate, a polycarbonate substrate the same in size as the substrate concerned was bonded with an ultraviolet curable resin to produce a DVD-R medium.

Then, with an optical disk evaluation apparatus (optical disk evaluation apparatus, ODU1000, manufactured by Pulstec Industrial Co., Ltd.), the jitter values, PI8 errors and PO errors of the thus produced DVD-R media in the initial condition subsequent to the production thereof were measured, and were verified to fall within the ranges of the DVD specifications. After the verification, the DVD-R media were subjected to an accelerated environment test in which the DVD-R media were exposed in an environment at a temperature of 80° C. and with a relative humidity of 85%, and the DVD-R media after the accelerated environment test were subjected to the measurement of the individual values by means of the evaluation apparatus.

Figure 2:
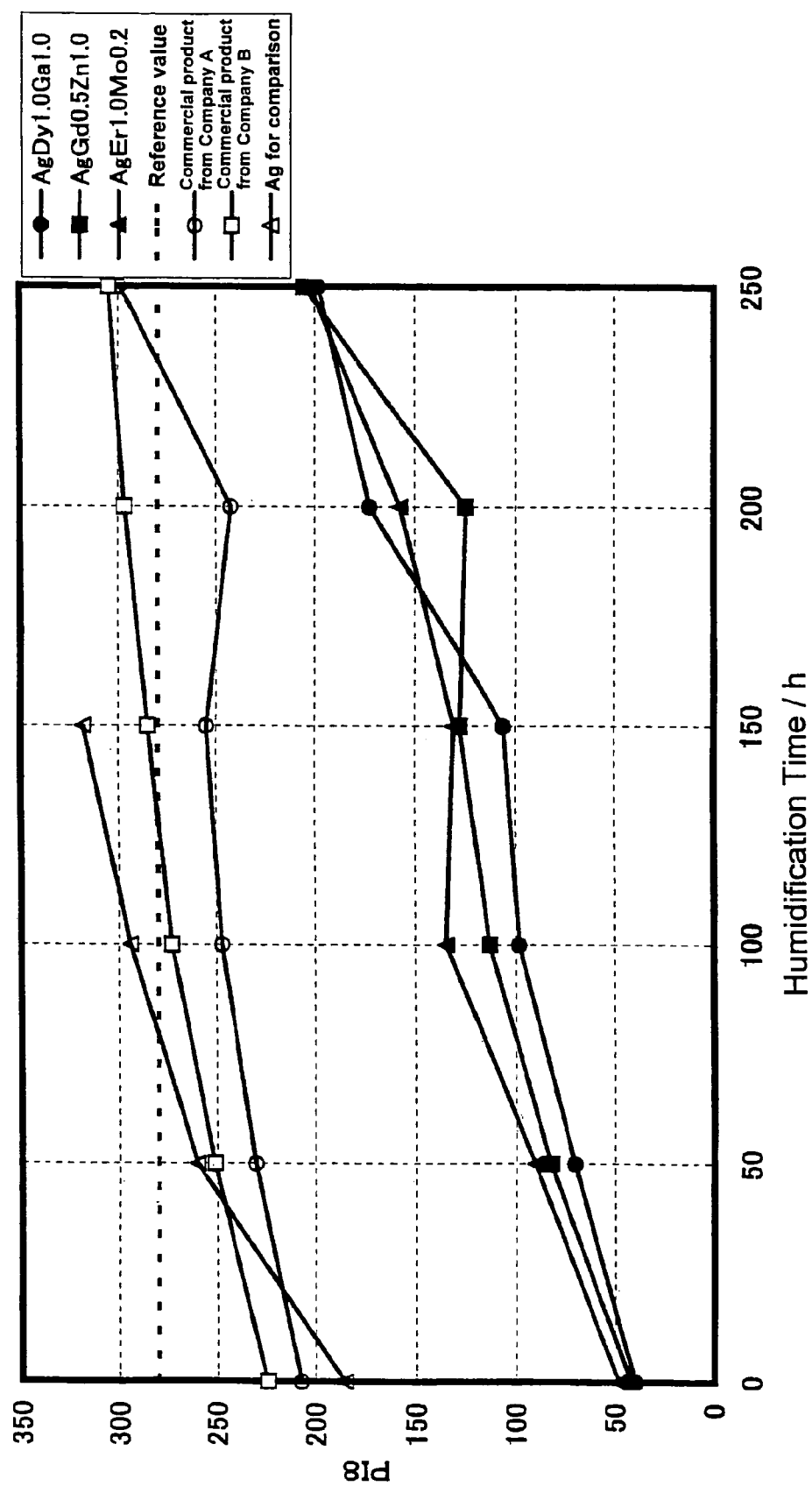
FIG. 2 is a graph showing the results (PI8 error values) of the accelerated environment test carried out on the DVD-R media each provided with one of the reflective films according to present Embodiment.
Figure 3:
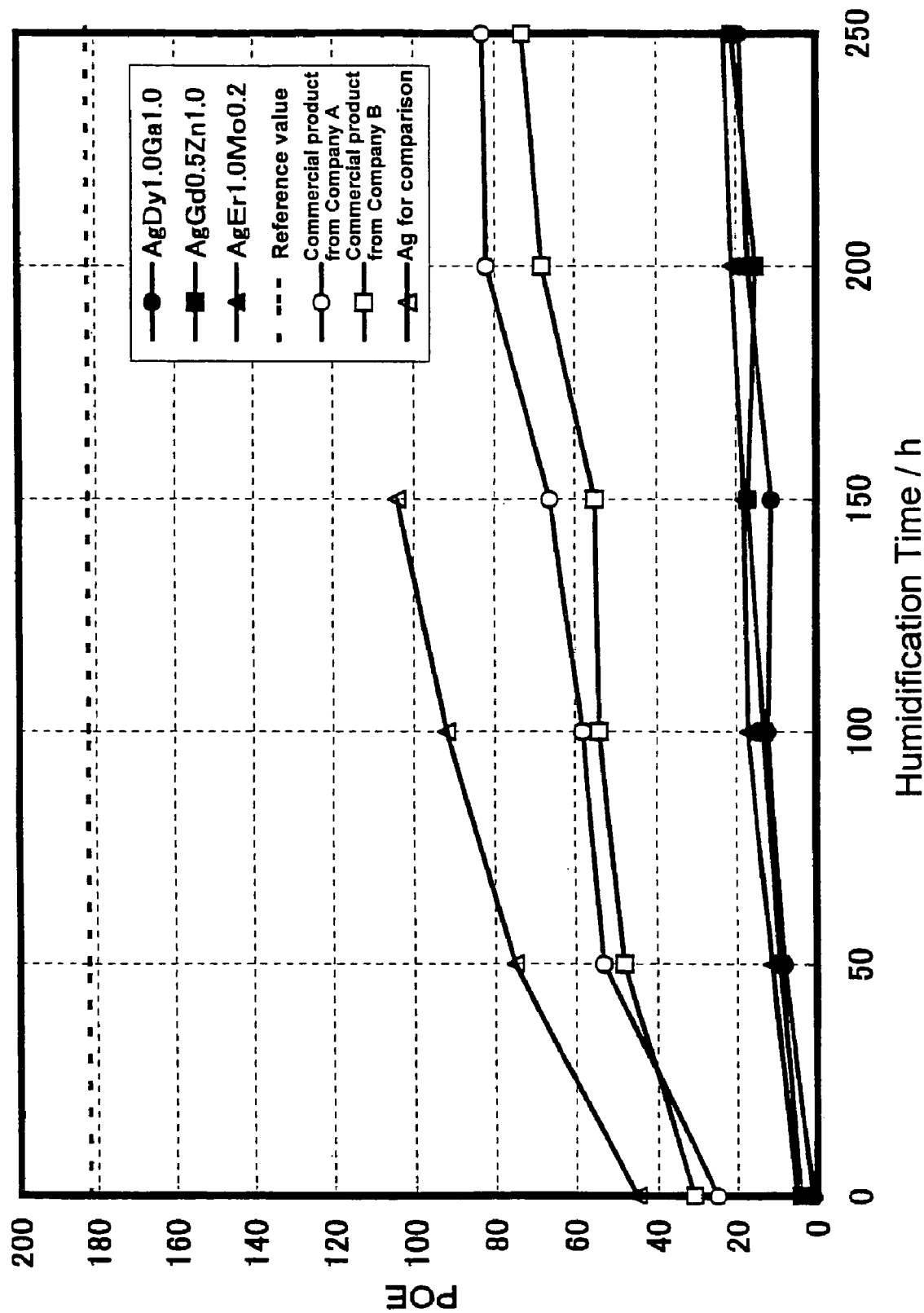
FIG. 3 is a graph showing the results (PO error values) of the 15 accelerated environment test carried out on the DVD-R media each provided with one of the reflective films according to present Embodiment.

FIGS. 1 to 3 show relations between humidification time and jitter value, PI8 error value and PO error, respectively, which were all measured in this test. These figures also show the results obtained by applying the same tests to a DVD-R medium having a reflective film made of pure silver and commercially available DVD-R media.

As can be seen from these figures, it has been verified that the recording media each provided with a reflective film made of a silver alloy according to the present invention each clear the specifications for the individual values, and have a long-term stability, even after a long time humidification. On the contrary, the recording medium provided with a reflective film made of pure silver failed to be recognized by the recording device and became unusable after humidification for 150 hours. It was also verified that the jitter values of the commercially available products exceeded the specification, and although the error values of these commercial products were able to clear the specifications, the properties of these commercial products were inferior to those of the recording media according to the present embodiment.

Additionally, Table 6 shows results obtained as follows: DVD-R media each provided with a reflective film made of a silver alloy different in composition from those examined above were produced; the DVD-R media thus produced were exposed in a humidification environment in the same manner as described above; and thereafter, the results shown in Table 6, namely, the jitter values, PI8 errors and PO errors thereof were measured.

TABLE 6

| | | Jitter value | | PI8 error | | PO error | |
|---|---|---|---|---|---|---|---|
| | | Initially | After exposure to humidity | Initially | After exposure to humidity | Initially | After exposure to humidity |
| Examples | Au—1.0Nd—1.0Ga | 7.7 | 7.8 | 48 | 241 | 5 | 24 |
| | Ag—1.0Ho—1.0Al | 7.7 | 7.8 | 51 | 257 | 6 | 25 |
| | Ag—1.0Pr—0.3Ni | 7.7 | 7.8 | 53 | 246 | 5 | 21 |
| | Ag—1.0Yb—0.2Co | 7.8 | 7.9 | 97 | 261 | 8 | 42 |
| | Ag—0.5Sm—1.0Sn | 7.8 | 7.9 | 113 | 277 | 9 | 48 |
| Comparative Examples | Ag | 8.2 | 11.7 | 207 | 299 | 25 | 83 |
| | Commercial product from Company A | 8.6 | 10.7 | 224 | 305 | 31 | 73 |
| | Commercial product from Company B | 8.3 | ≧11.9 | 185 | ≧318 | 45 | ≧104 |
| | Specification | 8.00 or less | | 280 or less | | 182 or less | |

Also from this table, it was verified that the individual values of the recording media each provided with a silver alloy according to the present invention as a reflective layer cleared the specifications even after the humidification, and each had a long-term stability. The evaluations carried out by producing these media coincided with the already performed, simulated test, and the long-term stability was owned by each of the recording media, anticipated to have satisfactory properties in the simulated test, each provided with a reflective film containing either dysprosium or gallium. Consequently, it has been verified that the simulated test carried out in the present embodiment is a convenient method for assessing the properties of a silver alloy without actually producing a recording medium.

The invention claimed is:

1. A silver alloy for use in a reflective film, consisting essentially of silver as a main element, erbium as a first dopant element, and gallium as a second dopant element, wherein the combined total concentration of the first and second dopant elements is from 0.01 to 3.0 atomic %.

2. The silver alloy for use in a reflective film according to claim 1, wherein the second dopant element further consists essentially of palladium.

3. The silver alloy for use in a reflective film according to claim 1, wherein the second dopant element further consists essentially of gold.

4. The silver alloy for use in a reflective film according to claim 1, wherein the second dopant element further consists essentially of copper.

5. The silver alloy for use in a reflective film according to claim 1, wherein the second dopant element further consists essentially of indium.

6. A sputtering target, comprising the silver alloy as defined in claim 1.

* * * * *